United States Patent [19]

Schlagmüller

[11] Patent Number: 4,750,706
[45] Date of Patent: Jun. 14, 1988

[54] VALVE FOR DOSING LIQUIDS OR GASES

[75] Inventor: Walter Schlagmüller, Schwieberdingen, Fed. Rep. of Germany

[73] Assignee: Robert Bosch GmbH, Stuttgart, Fed. Rep. of Germany

[21] Appl. No.: 893,899

[22] Filed: Jul. 29, 1986

[30] Foreign Application Priority Data

Sep. 24, 1985 [DE] Fed. Rep. of Germany ....... 3533975

[51] Int. Cl.[4] .......................... F16K 31/02; F16K 1/52
[52] U.S. Cl. .............................. 251/129.06; 239/102.2
[58] Field of Search ................ 251/129.06; 239/102.2

[56] References Cited

U.S. PATENT DOCUMENTS 4,494,727  1/1985  Babitzka et al. ............ 251/129.06 X
4,584,980  4/1986  Weiger et al. .............. 251/129.06 X

FOREIGN PATENT DOCUMENTS 2056559  3/1981  United Kingdom ............. 239/102.2
2094940  9/1982  United Kingdom ............ 251/129.06

Primary Examiner—Arnold Rosenthal
Attorney, Agent, or Firm—Michael J. Striker

[57] ABSTRACT

A valve for dosing liquids, or gases, particularly an injection valve for fuel injection systems of internal combustion engines, such as directly injecting diesel motors and the like, the valve comprises a valve housing having a dosing opening, a valve needle which controls the dosing opening, a valve closing spring cooperating with the valve needle and withdrawing the latter to a closing position in which the valve needle closes the dosing opening, a pizeoelectric adjusting member having a piezo stack which is longitudinaly changeable under the action of a control voltage, the piezo stack having two ends and being connected by its one end with a valve needle, an abutment connected with the other end of the piezo stack, the abutment being displaceable in an axial direction of the piezo stack and formed so that during a longitudinal change of the piezo stack caused by the control voltage it is spatially fixed relative to the housing, the abutment being formed as an electromagnetic arresting arrangement which is actively switched on at least during a time of opening of the valve.

18 Claims, 2 Drawing Sheets

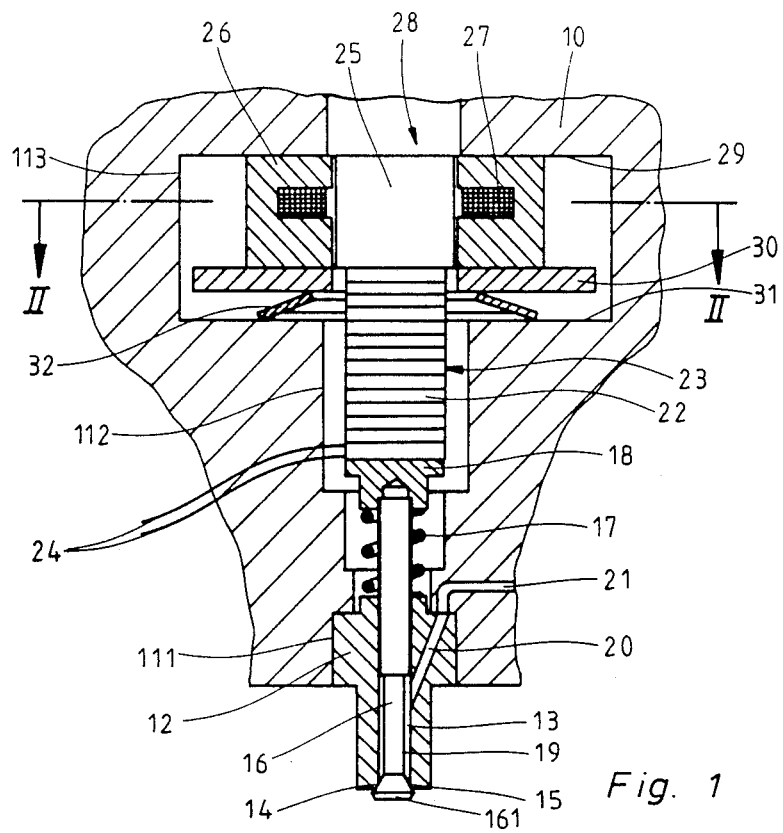
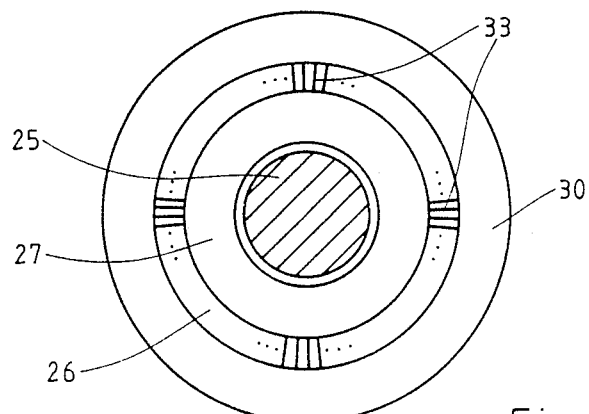

VALVE FOR DOSING LIQUIDS OR GASES

BACKGROUND OF THE INVENTION

The present invention relates to a valve for dosing liquids or gases, particularly an injection valve for fuel injection system in internal combustion engines.

More particularly, the present invention relates to such a valve which has a housing with a dosing opening, a valve needle which controls the dosing opening, a valve closing spring which retracts the valve needle to its closing position in which it blocks the dosing opening, a piezoelectric adjusting member formed as a piezo stack which is longitudinally changeable under the action of a control voltage and is connected at its one end with the valve needle, and at its other end with an abutment displaceable in an axial direction of the piezo stack and formed so that it is spatially fixed relative to the housing during the longitudinal change of the piezo stack under the action of the control voltage.

An injection valve of this type is known in the art and disclosed, for example, in the British patent application No. 2,056,559.

Here, the abutment is formed as a damping piston which is arranged in a fuel-filled damping cylinder. The damping cylinder communicates via an opening with a fuel supply. The damping piston abuts against the piezo stack under the action of the valve closing spring which is arranged in the damping cylinder, and the piezo stack presses the valve needle against the valve seat which surrounds the injection opening and in turn blocks the injection opening. When a control voltage is applied to the piezoelectric adjusting member, the piezo stack contracts and shortens its length by approximately 30 mm. The mass of the damping piston and the damping action of the fuel in the damping cylinder acts so that the abutment for the movement of the piezo stack contraction is always stationarily fixed, and the contraction of the piezo stack does not produce any displacement of the damping piston through the valve closing spring. As a result of this, the entire longitudinal change of the piezo stack is converted into a stroke movement of the valve needle, so that the relatively small adjusting path of the piezo stack is completely used for opening of the injection valve.

When the injection valve is closed, the longitudinal displacements of the piezo stack by temperature changes or length differences of the entire system of valve needle, piezo stack and damping piston, by wear or manufacturing tolerances, produce a respective displacement of the damping piston. Since the housing-fixed abutment of the piezo stack takes place during the valve actuation, these influences are completely compensated and does not affect the stroke path of the valve needle and thereby the injection cross-section released by the valve needle. The dosing and thereby the injection quantity is dependent on temperature, manufacturing tolerances or wear and is approximately constant. A continuous reproduction of the injected fuel quantities is therefore guaranteed.

It should be mentioned that this known construction principle of fixation of the abutment of the piezo stack during the dosing phase cannot be transferred to the piezoelectric control member when the adjusting path is generated by longitudinal expansion of the piezo stack. In these cases the pressure force which acts during the expansion of the piezo stack upon the damping piston causes a displacement which is considerable as compared with the relatively small adjusting path of the piezo stack of typically 20 mm. A partial quantity of the fuel located in the damping cylinder can be approximately unthrottled and thereby displaces very fast through the opening in the fuel supply. Only during strong throttling of the fuel discharge it cannot be assumed that small quantities cannot be discharged sufficiently enough or the liquid volume accommodated in the damping cylinder is completely without gas influence and thereby incompressible. A high mass inertia of the damping piston can be used only conditionally and considerably increases the structural volume of the valve.

Any, even insignificant displacement of the damping piston and thereby of the housing-fixed abutment of the piezo stack during the valve opening leads to a changing stroke path of the valve needle and to a change of the opening—or dosing cross-section of the valve. The dosing of especially small quantities is thereby inaccurate and changes in each dosing phase. Thereby it is impossible to achieve either the required dosing accuracy or the required dosing constancy in dependence of the valve opening time.

SUMMARY OF THE INVENTION

Accordingly, it is an object of the present invention to provide a valve for dosing liquids or gases which avoids the disadvantages of the prior art.

In keeping with these objects and with others which will become apparent hereinafter, one feature of the present invention resides, briefly stated, in that the abutment connected with the end of the piezo stack is formed as an electromagnetic arresting arrangement which is operative so that it is closed during the time of valve opening.

When the valve is designed in accordance with the present invention, it has the advantage that by the tolerance-free fixation of the support for the piezo stack, always the full longitudinal expansion of the piezo stack is converted into a stroke path of the valve needle, and always the identical dosing cross-section is released and thereby an extremely accurate dosing is maintained. This is true for the situations whether the piezoelectric adjusting member generates the adjusting path by the longitudinal expansion or by the longitudinal reduction of the piezo stack.

The dosing accuracy is reproducible any number of times, and the dosing quantity at predetermined dosing pressure depends exclusively on the time of the valve opening. The electromagnetic arresting arrangement has, in addition, a small volume and thereby can be unobjectionably integrated into the valve housing of a small dosing valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a longitudinal section of an injection valve for an internal combustion engine, in a section;

FIG. 2 is a view showing a section of the injection valve of FIG. 1 taken along the line II—II in FIG. 1;

DESCRIPTION OF THE PREFERRED EMBODIMENTS

Figure 3:
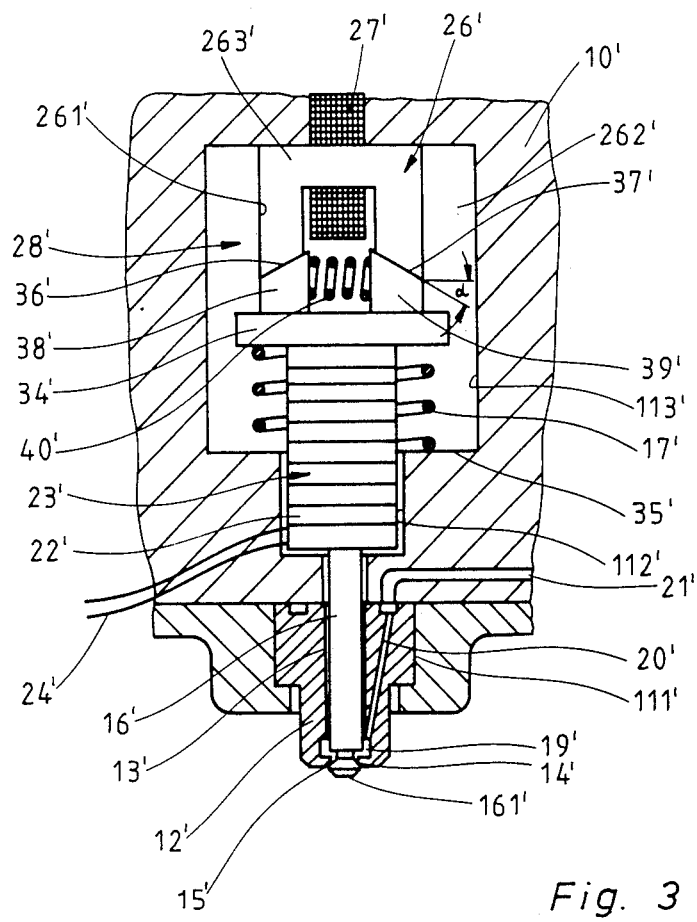
FIG. 3 is a longitudinal section of an injection valve in accordance with a further embodiment of the invention.

FIG. 1 shows an example of a dosing valve for dosing of liquids or gases formed as an injection valve for fuel injection devices in internal combustion engines. Essential values, such as injection quantity, injection rate, injection start and injection end can be electrically determined. The injection valve has a housing which is identified with reference numeral 10. The housing is provided with a stepped opening 11 having stepped opening portions of different diameters. A lower opening portion 111 which faces toward the combustion chamber, accommodates a valve body 12 having a through opening 13. The through opening 13 opens into a dosing or valve opening 14 which is surrounded by a valve seat 15 in a ring-shaped manner.

A valve needle 16 is guided in the through opening 13 and has a needle head 161 of an increased diameter. The needle head 161 is seated against the valve seat 15 under the action of a valve closing spring 17 and seals the valve opening 14. The valve closing spring 17 abuts at its one end against the valve body 12, and at its other end against a ring flange 18 which is fixedly connected with the valve needle 16 at its end facing away from the needle head 161. A ring chamber 19 is formed before the valve seat 15 in the through opening 13. It communicates via a supply opening 20 with a fuel supply passage 21. For preventing excessively high pressure drop during injection, an accumulator is arranged advantageously between the supply opening 20 and the fuel supply passage 21. Such accumulator can be formed as a central opening portion 112.

A piezo stack 22 of piezoelectric adjusting members 23 is arranged in the central opening portion 112. Electrical conductors 24 can supply exciting voltage to the piezo stack. By applying exciting voltage, the piezo stack 22 increases its axial length in a known manner. The longitudinal change typically amounts to approximately 3.0 $\mu$m. The piezo stack 22 which conventionally is assembled of individual piezoelectric discs is fixedly connected at its end side with the ring flange 18 and carries at its other end side a cylindrical armature 25 which is introduced completely to the interior of the hollow cylindrical yoke 26 with a play. A ring-shaped exciting coil 27 is held in the yoke 26. The armature 25, the yoke 26, and the exciting coil 27 form an electromagnetic arresting device 28, by means of which the piezo stack 22 is spatially fixed relative to the valve housing 10 during its longitudinal change actuated by the control voltage. The fixation of the piezo stack 22 is performed by effective switching of the arresting device 28 at least for the time of the valve opening.

The electromagnetic arresting device 28 is accommodated in a third opening portion 113. The yoke is held between a ring shoulder 29 located at a valve side of the housing, and a supporting disc 30. A plate spring 32 is arranged between the supporting disc 30 and a further ring shoulder 31 of the valve housing 10. The plate spring 3 fixes the yoke 26 in the opening portion 113.

As can be seen from FIG. 2, the yoke 26 is subdivided into a plurality of yoke sheets 32 having a U-shaped profile. During current application of the exciting coil 27, they abut against the armature 25 and thereby stationarily clamp the same. Instead of yoke sheets 33, the yoke 26 can be subdivided into greater yoke segments, and a subdivision of the yoke into two semi-circular ring segments is sufficient. In the latter case, however, it is necessary to take measures for an insignificant radial movement of the yoke 26 during holding of the yoke 26 between the ring shoulder 29 and the supporting disc 30. Such play can be obtained by respective dimensioning of the plate spring 32.

The control of the electromagnetic arresting device 28 is selected so that the exciting coil 27 is always provided with exciting current, and only after injection end after repeated closing of the valve opening 14, it is currentless over a short time. In this currentless condition of the exciting coil 27, the arresting device 28 does not operate and the armature 25 can axially displace into the yoke 26. Thereby, temperature-dependent longitudinal changes of the piezo stack 22 as well as manufacturing tolerances or wear are compensated. In the moment of the valve opening, the piezo stack 22 lies fixedly at the housing side, so that the constant adjusting path adjusted by the piezo stack 22 can be completely used for the valve needle stroke.

An injection valve shown in FIG. 3 differs from the injection valve of FIG. 1 only by a different construction of the electromagnetic arresting device 28'. The parts of this valve which correspond to the parts of the valve of FIG. 1 are identified with the same reference numerals with added primes.

The piezo stack 22' is connected at its one end side 21' directly with the valve needle 15', and carries at its other end side an armature blade 34' of an increased diameter. The valve closing spring 17' is here arranged between the armature plate 34' and an abutment 35' at the housing side. It acts in the same manner for pressing the needle head 161' of the needle head 16' against the valve seat 15' which surrounds the valve opening 14'. The yoke 26' of the electromagnetic arresting device 28' has a horseshoe shape and carries the ring-shaped exciting coil 27' at its web 263'. The web 263' connects the legs 261' and 262' of the horseshoe-shaped yoke 26' with one another so as to form a one piece member. The legs 261' and 262' are arranged normal to the armature plate 34'. Their end surfaces 36' and 37' extend at an acute angle of inclination $\alpha$ relative to the armature plate 34'. Wedge elements 38' and 39' are each arranged between the armature plate 34' and the respective yoke legs 261' and 262'. Each wedge element 38' or 39' has two wedge surfaces arranged so that one wedge surface extends parallel to the armature plate 34' while another wedge surface extends parallel to the end surface 36' or 37' of the yoke leg 261' or 262'. Each wedge element 38' or 39' therefore lies with its wedge surface on the one hand against the armature blade 34' and on the other hand against the end surface 36' or 37' of the yoke leg 261' or 262'. A pressure spring 40' is arranged between both wedge elements 38' and 39' and acts parallel to the armature blade 34'. The angle of inclination of the end surfaces 36', 37' of the yoke legs 261', 262' and thereby the wedge angle of the wedge elements 38', 39' is selected greater than the static friction angle $\rho$. The closer the angle of inclination approaches the static friction angle $\rho$, the smaller the electromagnet formed by the yoke 26' and exciting coil 27' can be designed.

The control of the exciting coil 27' is selected so that in the period from shortly after the injection end to shortly before the injection start, it is currentless, and is under current only during the time of valve opening. Thereby, the piezo stack 22 is fixed to the housing during its exciting phase. With currentless magnets, the relative movement of the valve actuating system composed of the valve needle 16', the piezo stack 22' and armature blade 34', which is caused mainly by temperatur dependent longitudinal changes of the piezo stack 22, is compensated by displacement of the wedge element 38', 39' radially on the armature plate 34' in an outward direction or in an inward direction. A reduction of the length of the piezo stack 22' results in traveling of the wedge elements 38', 39' caused by the pressure spring 40' in the outward direction. An increase of the axial length of the piezo stack 22' results in an inward sliding of the wedge element 38', 39' against the action of the pressure spring 40'. Manufacturing tolerances or wear in the actuating system composed of the valve needle 16', piezo stack 22' and armature plate 34' as well as in the wedge elements 38', 39' and the yoke 26' are compensated in the same manner. The manufacturing tolerances are also compensated during mounting of the yoke 26' in the opening portion 113.

The advantage of the electromagnetic arresting device 28' shown in FIG. 3 as compared with the arresting device 28 shown in FIG. 1, is that the reaction forces of the piezo stack 22 can be absorbed with an essentially smaller electromagnet. It is therefore possible to keep the volume of the electromagnetic arresting device 28' very small to contribute to its integration in the valve housing 10 or 10'.

It will be understood that each of the elements described above, or two or more together, may also find a useful application in other types of constructions differing from the types described above.

While the invention has been illustrated and described as embodied in a dosing valve for dosing liquids or gases, it is not intended to be limited to the details shown, since various modifications and structural changes may be made without departing in any way from the spirit of the present invention.

Without further analysis, the foregoing will so full reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims

1. A valve for dosing liquids or gases, particularly an injection valve for fuel injection systems of internal combustion engines, such as directly injecting diesel motors and the like, the valve comprising a valve housing having a dosing opening; a valve needle which controls said dosing opening; a valve closing spring cooperating with said valve needle and withdrawing the latter to a closing position in which said valve needle closes said dosing opening; a piezoelectric adjusting member having a piezo stack which is longitudinally changeable under the action of a control voltage, said piezo stack having two ends and being connected by its one end with said valve needle; an abutment connected with the other end of said piezo stack, said abutment being displaceable in an axial direction of said piezo stack and formed so that during a longitudinal change of the piezo stack caused by the control voltage it is spatially fixed relative to said housing, said abutment being formed as an electromagnetic arresting arrangment which is actively switched on at least during a time of opening of said valve.

2. A valve as defined in claim 1, wherein said arresting arrangement includes an armature plate fixedly connected with said piezo stack and extends transversely to the latter, an exciting coil, a magnet yoke having a web which carries said exciting coil and also two yoke legs are of one place with said web and are formed so that they lie normal to said armature plate and have end faces which extend under an acute of inclination to said armature plate, and two wedge elements located between said armature plate and said yoke legs and having wedge surfaces each parallel to said armature plate and said end surfaces of said yoke legs and abutting against said armature plate and said end surfaces of said yoke legs.

3. A valve for dosing liquids or gases, particularly an injection valve for fuel injection systems of internal combustion engines, such as directly injecting diesel motors and the like, the valve comprising a valve housing having a dosing opening; a valve needle which controls said dosing opening; a valve closing spring cooperating with said valve needle and withdrawing the latter to a closing position in which said valve needle closes said dosing opening; a piezoelectric adjusting member having a piezo stack which is longitudinally changeable under the action of a control voltage, said piezo stack having two ends and being connected by its one end with said valve needle; and abutment connected with the other end of said piezo stack, said abutment being displacable in an axial direction of said piezo stack and formed so that during a longitudinal change of the piezo stack caused by the control voltage it is spatially fixed relative to said housing, said abutment being formed as an electromagnetic arresting arrangement which is actively switched on at least during a time of opening of said valve, said electromagnetic arresting arrangement including a bar-shaped armature which is fixedly connected with said piezo stack, an exciting coil which surrounds said armature and has an axial length substantially smaller than that of said armature, and a yoke which is fixed to said housing and received said exciting coil, said yoke surrounding said armature so as to leave a ring-shaped air gap therebetween and being subdivided into a plurality of yoke portions which abut one another in a longitudinal direction and allows supporting against said armature when current is applied to said exciting coil.

4. A valve as defined in claim 3, wherein said yoke parts are formed as yoke segments which abut against one another in the longitudinal direction.

5. A valve as defined in claim 3, wherein said yoke parts are formed as yoke sheets which abut against one another in the longitudinal direction.

6. A valve as defined in claim 3, wherein said armature is roller-shaped, said exciting coil is ring-shaped, and said yoke is hollow-cylindrical, said exciting coil being inserted in said yoke.

7. A valve as defined in claim 5, wherein said yoke sheets have a U-shaped profile.

8. A valve as defined in claim 3, wherein said yoke has two end sides; and further comprising two supporting members including a first supporting member connected with said housing and against which one side of said yoke abuts, and a second supporting member formed as a supporting disc and against which the other side of said yoke abuts; and a pressure spring abutting against said housing and said supporting disc.

9. A valve as defined in claim 8, wherein said first supporting member is formed as a ring shoulder of said housing.

10. A valve as defined in claim 8, wherein said pressure spring is formed as a plate spring.

11. A valve as defined in claim 3; and further comprising current supplying means arranged so that current supply of said exciting coil is interrupted for short time after a dosing end.

12. A valve as defined in claim 1, wherein said valve closing spring abuts against said housing and engages said piezo stack at its one end with which said piezo stack is connected with said valve needle.

13. A valve as defined in claim 1, wherein said arresting arrangement includes an armature plate fixedly connected with said piezo stack and extends transversely to the latter, an exciting coil, a magnet yoke having a web which carries said exciting coil and also two yoke legs which are of one piece with said web and are formed so that they lie normal to said armature plate and have end faces which extend under an acute angle of inclination to said armature plate, and two wedge elements located between said armature plate and said yoke legs and having wedge surfaces each parallel to said armature plate and said end surfaces of said yoke legs and abutting against said armature plate and said end surfaces of said yoke legs.

14. A valve as defined in claim 13, wherein said end surfaces of the yoke legs are inclined so that they raise toward said web; and further comprising a pressure spring arranged between said wedge elements parallel to said armature plate.

15. A valve as defined in claim 13; and further comprising means for supplying current to said exciting coil and formed so that said exciting coil is currentless during dosing pauses until shortly before a dosing start.

16. A valve as defined in claim 13, wherein said armature plate has a side facing away of said wedge elements, said valve closing spring abutting against said housing and pressing against said side of said armature plate.

17. A valve as defined in claim 13, wherein said angle of inclination of said end surfaces of said yoke legs is greater than an angle of static friction and approaches the latter as close as possible.

18. A valve for dosing liquids or gases, particularly an injection valve for fuel injection systems of internal combustion engines, such as directly injecting diesel motors and the like, the valve comprising a valve housing having a dosing opening; a valve needle which controls said dosing opening; a valve closing spring cooperating with said valve needle and withdrawing the latter to a closing position in which said valve needle closes said dosing opening; a piezoelectric adjusting member having a piezo stack which is longitudinally changeable under the action of a control voltage, said piezo stack having two ends and being connected by its one end with said valve needle; an abutment connected with the other end of said piezo stack, said abutment being displaced in an axial direction of said piezo stack and formed so that during a longitudinal change of the piezo stack caused by the control voltage it is spatially fixed relative to said housing, said abutment being provided with an electromagnetic arresting arrangement having at least one moveable part which is arranged between said abutment and a fix part of said housing and held in permanent contact to said fix part by means of a spring, said moveable part being rigidly coupled to said abutment and said fix part by means of an electrically controlled force at least during a time of opening of said valve, and released after closure of said valve.

* * * * *